United States Patent [19]

Krings et al.

[11] 3,954,643

[45] May 4, 1976

[54] FOAM-REGULATED WASHING COMPOSITIONS, ESPECIALLY FOR DRUM WASHING MACHINES

[75] Inventors: Peter Krings, Krefeld; Günter Jakobi, Hilden; Joachim Galinke, Dusseldorf-Holthausen, all of Germany

[73] Assignee: Henkel & Cie GmbH, Dusseldorf, Germany

[22] Filed: Aug. 24, 1973

[21] Appl. No.: 391,262

[30] Foreign Application Priority Data

Sept. 2, 1972 Germany .......... 2243306

[52] U.S. Cl. .......... 252/96; 252/121; 252/132; 252/555; 252/557; 252/321; 252/358; 252/DIG. 2; 252/DIG. 11

[51] Int. Cl.[2] .......... C11D 3/37; C11D 9/26; C11D 10/04; B01D 19/04

[58] Field of Search .......... 252/109, 110, 121, 536, 252/538, 555, 557, 321, 358, 97, DIG. 2, DIG. 11, 89, 96

[56] References Cited

UNITED STATES PATENTS

| | | | |
|---|---|---|---|
| 2,954,347 | 9/1960 | St. Jonn | 252/109 |
| 2,954,348 | 9/1960 | Schwoeppe | 252/109 |
| 3,308,067 | 3/1967 | Diehl | 252/550 |
| 3,332,880 | 7/1967 | Kessler | 252/536 X |
| 3,676,338 | 7/1972 | Fries | 252/8.75 |
| 3,676,340 | 7/1972 | Berg | 252/8.75 |
| 3,700,600 | 10/1972 | Nagel | 252/99 |
| 3,704,228 | 11/1972 | Eckert | 252/117 |
| 3,729,431 | 4/1973 | Smitherman | 252/535 |
| 3,730,912 | 5/1973 | Inamorato | 252/528 |

*Primary Examiner*—Dennis L. Albrecht
*Attorney, Agent, or Firm*—Hammond & Littell

[57] ABSTRACT

A foam-regulated washing composition based on olefin-sulfonates and/or salts of α-sulfo-fatty acid esters and phosphorus-free complexing builder salts, especially for drum washing machines and also at wash temperatures of over 90°C characterized by a content of:

a. a surface-active component of 50 to 100% by weight of said component of olefin sulfonates and/or salts of α-sulfo-fatty acid esters and 0 to 50% by weight of said component of other anionic surface-active compounds of the sulfonate and sulfonate type and/or non-ionic surface-active compounds with good biodegradability and low toxicity;

b. a soap of saturated fatty acids having essentially 18 to 24 carbon atoms; and c. a complexing builder salt component of 75 to 100% by weight of said component of a high-molecular-weight polyalkylene-polycarboxylic acid copolymer of a lower alkene with an ethylenically unsaturated dicarboxylic acid or tricarboxylic acid and 0 to 25% by weight of said component of other complexing builder salts such as sodium tripolyphosphate.

5 Claims, No Drawings

FOAM-REGULATED WASHING COMPOSITIONS, ESPECIALLY FOR DRUM WASHING MACHINES

THE PRIOR ART

With regard to the question of protection of the environment, washing compositions with components having a biological effect on the waste water are of undoubted importance. While the synthetic surface-active components of the washing compositions are required to be biologically decomposable, their complex-forming builder salts are required not to be conducive to eutrophication of the surface water.

Owing to their good biological decomposability and high cleansing power, the synthetic surface-active compounds of the olefinsulfonate and α-sulfo-fatty acid ester types are of particular interest. Washing liquors with these surface-active compounds, however, develop a considerable amount of foam with vigorous mechanical washing and at the boiling temperature, so that the problem of foam regulation occurs especially on washing in drum washing machines. It is indeed known to regulate the foaming power of washing compositions based on alkylbenzenesulfonate as the surface-active component and sodium tripolyphosphate as the complex-forming component by an addition of a soap of saturated fatty acids with substantially 20 to 24 carbon atoms, over the whole range of use in the drum washing machines. Unsatisfactory results, however, are obtained with this measure with combinations of olefinsulfonates and/or sulfo-fatty acid esters with sodium tripolyphosphate.

In addition, the technician has also the problem of replacing the previously customarily used sodium tripolyphosphate by a phosphorus-free complex-forming builder salt since it has been published that the increasing eutrophication of the waters — even without conclusive evidence — is due to a considerable extent to the phosphates present in washing compositions.

OBJECTS OF THE INVENTION

An object of the present invention is the developing of a foam-regulated washing composition based on an olefinsulfonate and/or an α-sulfo-fatty acid ester and a phosphorus-free complex-forming builder salt, which is also suitable for use in drum washing machines and at washing temperatures above 90°C and in such case does not cause foaming over of the washing liquor.

A further object of the present invention is the development of a foam-regulated washing composition consisting essentially of a. a surface-active component consisting of from 50 to 100% by weight of said component of an anionic surface-active compound selected from the group consisting of olefinsulfonates and α-sulfo-fatty acid ester salts and from 0 to 50% by weight of said component of a surface-active compound having good biodegradability and low toxicity selected from the group consisting of anionic surface-active compounds of the sulfonate and sulfate type other than said olefinsulfonates and α-sulfo-fatty acid ester salts and non-ionic surface-active compounds, b. soaps of essentially saturated fatty acids having an iodine value of less than 5 and at least 50% of which have from 20 to 24 carbon atoms, and c. a complexing builder salt component consisting of from 75 to 100% by weight of said component of a high-molecular-weight polyalkylene-polycarboxylic acid copolymer of a lower alkene having from 2 to 4 carbon atoms with an ethylenically unsaturated acid having from 4 to 8 carbon atoms selected from the group consisting of alkenedioic acids and alkenetrioic acids, in substantially an equimolar ratio, and from 0 to 25% by weight of said component of complexing builder salts having phosphorus or nitrogen atoms.

These and other objects of the invention will become more apparent as the description thereof proceeds.

DESCRIPTION OF THE INVENTION

It has now been found that this problem is solved according to the invention by a washing composition which consists essentially of the following components:

a. a surface-active component consisting of an olefinsulfonate or an α-sulfo-fatty acid ester salt, in which the olefinsulfonates and α-sulfo-fatty acid ester salts can be replaceable up to a half of their total amount by weight by other anionic surface-active compounds of the sulfonate and sulfate type and/or by non-ionic surface-active compounds, with good biological decomposability and low toxicity;

b. a soap from essentially saturated fatty acids having essentially 18 to 24, preferably 20 to 24 carbon atoms, and c. a complex-forming salt based on a high-molecular-weight polyalkene-polycarboxylic acid obtainable by copolymerization of a lower alkene with an ethylenically unsaturated dicarboxylic or tricarboxylic acid, while up to a quarter of the total amount by weight of this complex-forming salt is replaceable by other complex-forming substances.

More particularly, the invention is a foam-regulated washing composition consisting essentially of a. a surface-active component consisting of from 50 to 100% by weight of said component of an anionic surface-active compound selected from the group consisting of olefin— 0 to 50% by weight of said component of a surface-active compound having good biodegradability and low toxicity selected from the group consisting of anionic surface-active compounds of the sulfonate and sulfate type other than said olefinsulfonates and α-sulfo-fatty acid ester salts and non-ionic surface-active compounds, b. soaps of essentially saturated fatty acids having an iodine value of less than 5 and at least 50% of which have from 20 to 24 carbon atoms, and c. a complexing builder salt component consisting of from 75 to 100% by weight of said component of a high-molecular-weight polyalkylene-polycarboxylic acid copolymer of a lower alkene having from 2 to 4 carbon atoms with an ethylenically unsaturated acid having from 4 to 8 carbon atoms selected from the group consisting of alkenedioic acids and alkenetrioic acids, in substantially an equimolar ratio, and from 0 to 25% by weight of said component of complexing builder salts having phosphorus or nitrogen atoms.

Preferably components (a), (b) and (c) in the foam-regulated washing composition of the invention are present in a weight ratio of 2 to 10:1:7 to 35, preferably 2½ to 8 ½:1:7½ to 25.

In the washing process, especially in drum washing machines, a foam regulation over the whole temperature range of from 20°C to the boiling point is obtained with the washing compositions according to the invention. Under the usual concentrations in use of the washing compositions of the invention of 2 to 10 gm/liter and in the presence of dirty laundry in the temperature range of from 20° to 30°C, a considerable foaming of the washing bath, and with rising temperature a decrease of the foaming, is observed, so that finally in the boiling temperature range no foaming over in the washing machine occurs.

The olefinsulfonates mentioned under (a) consist of mixtures of alkenesulfonates, hydroxyalkanesulfonates and alkanedisulfonates, which are formed on acid or alkaline hydrolysis of the sulfonation products first formed from terminal or non-terminal $C_{8-18}$ and preferably $C_{12-18}$-olefins by sulfonation with sulfur trioxide. The olefinsulfonates are preferably utilized in the form of their water-soluble salts as will be defined later. The same, however, may be employed in the free acid form provided that the solutions of the compositions of the invention are alkaline reacting.

The $\alpha$-sulfo-fatty acid ester salts include the salts of esters of the saturated fatty acids sulfonated in the $\alpha$-position and having 10 to 20, preferably 12 to 18, carbon atoms. Such fatty acids are preferably derived from natural fats. The alcohol residue of the ester is derived from a lower mono- or polyhydric aliphatic alcohol. Of the monohydric alcohols of the ester moiety, alkanols having 1 to 4 carbon atoms are preferred, especially methanol and ethanol. The polyhydric alcohols of the ester moiety are preferably alkanediols having 2 to 4 carbon atoms and alkanetriols having 3 to 4 carbon atoms such as glycerine. The $\alpha$-sulfo-fatty acid esters are preferably utilized in the form of their water-soluble salts as will be defined later. The same, however, may be employed in the free acid form provided that the solutions of the compositions of the invention are alkaline reacting.

The soaps defined under (b) are derived essentially from stearic, arachidic, behenic and lignoceric acids. Mixtures of these fatty acids are preferably used, such as are obtainable from naturally occuring triglycerides, for example, from hardened rape oil and fish oil fatty acids. The soaps preferably used are mixtures in which the $C_{20}$ and $C_{22}$ fatty acid fractions together form over 50% of the mixture and the iodine value of the fatty acid mixture is less than 5. Fatty acids of chain lengths $C_{12-16}$ may be present in subordinate amounts.

The complex-forming salts (c) consists of copolymerizates of lower alkenes having 2 to 4 carbon atoms, as for example, ethylene and propylene with ethylenically unsaturated dicarboxylic and tricarboxylic acids from the group of maleic acid, itaconic acid, mesaconic acid, aconitic acid, methylenemalonic acid, or citraconic acid, which after the copolymerization are converted into water-soluble salts as will be defined later. The copolymers are in substantially equimolar amounts with respect to the starting monomer units and have a degree of polymerization of from 3 to 500, preferably 4 to 200. The copolymers derived from maleic acid, which may be prepared by copolymerization of ethylene or propylene with maleic acid anhydride are preferred, and especially the complex-forming substances from 1:1 copolymerizates of ethylene and maleic acid and of propylene and maleic acid having a degree of polymerization of between 4 and 200.

As indicated previously, up to 50% by weight of the component (a) of the composition of the invention can be replaced with other anionic surface-active compounds of the sulfonate and sulfate type and non-ionic surface-active compounds, which have a good biodegradability and a low toxicity. Preferably these other compounds are the alkylbenzenesulfonates with preferably straight chain $C_{9-15}$, especially $C_{10-14}$ alkyl residues, the alkanesulfonates, obtainable from preferably saturated aliphatic $C_{8-18}$, especially $C_{12-18}$ hydrocarbons by way of sulfochlorination and sulfoxidation, the fatty alcohol sulfates with 10 to 18 carbon atoms, sulfated fatty acid alkylolamides or fatty acid monoglycerides, as well as sulfated alkoxylation products of alkylphenols ($C_8$-$C_{15}$ alkyl), fatty alcohols (8 to 18 carbon atoms), fatty acid amides (8 to 18 carbon atoms), or fatty acid alkylolamides (8 to 18 carbon atoms in the fatty acid and 1 to 4 carbon atoms in the alkylol) with 0.5 to 20, preferably 1 to 8 and especially 2 to 4 ethoxy and/or propoxy units in the molecule. Particularly suitable non-ionic surface-active compounds are fatty alcohol polyglycol ethers from saturated or unsaturated fatty alcohols of natural or synthetic origin with 10 to 18 carbon atoms in the alkyl chain and 4 to 15 ethyleneglycolether groups.

As indicated previously, up to 25% by weight of the component (c) may be replaced with known complex-forming builder salts of the type of condensed phosphates, especially tripolyphosphate, and the aminopolycarboxylic acids as, for example, nitrilotriacetic acid, ethylenediaminetetraacetic acid, polyalkylene-polyamine-N-polycarboxylic acids, polyhydroxycarboxylic acids, which are preparable by oxidative polymerization of acrolein or copolymerization of acrolein and acrylic acid and subsequent Cannizzaro reaction, polycarboxylic acids as, for example, polymaleates, polyitaconates, and complex-forming diphosphonic, triphosphonic and tetraphosphonic acids as, for example, methylenediphosphonic acid, 1-hydroxyethane-1,1-diphosphonic acid, 1-aminoethane-1,1-diphosphonic acid, amino-tri-(methylenephosphonic acid), methylamine-di-(methylenephosphonic acid) or ethylamino-di-(methylenephosphonic acid) as well as ethylenediaminetetra-(methylenephosphonic acid).

When phosphorus and/or nitrogen-containing complex-forming substances of the above-mentioned type are used instead of the copolymerizates according to (c) in subordinate amounts, i.e., up to 25%, this leads to a considerable reduction of the phosphorus and/or nitrogen content in the waste water compared with commercial washing compositions with a high content of condensed phosphates or aminopolycarboxylates.

The complex-forming power of the copolymerizates used according to the invention is specially marked in the case of the alkaline earths; on the other hand, their complex-forming power for heavy metals is small. It is, therefore, advisable to add to the compositions according to the invention small amounts of compounds forming complexes with heavy metals, for example, 0.1 to 5%, preferably 0.1 to 2% by weight. Examples of suitable complex-forming compounds for heavy metals, especially for copper, are the above-mentioned aminopolycarboxylic acids and phosphonic acids.

The anionic surface-active compounds which may be used according to the invention as well as the copolymerizates and the possibly present other complex-forming substances are preferably used in the form of their alkali metal, ammonium, lower alkylamine, lower alkylolamine or morpholine salts. Most preferably they are employed as the sodium salts. They may also be present as potassium or ammonium salts or as salts of aliphatic amines or alkylolamines with not more than 6 carbon atoms in the molecule, for example, as salts of diethylamine or triethylamine, mono-, di- or triethanolamine, mono- or dihydroxypropylamine, morpholine and so forth.

Further suitable components of the washing compositions according to the invention are substances which exert no substantial influence on the foaming behavior, the biodegradability and the eutrophication of water. These include soil suspension agents or dirt carriers, textile softeners, optical brighteners, bleaching agents, alkaline or neutral-reacting non-complex-forming salts, antimicrobial agents, enzymes, dyestuffs and perfumes.

The washing compositions according to the invention are prepared in solid form, as pastes, dispersions or solutions. When the compositions are solid, they are mostly fine to granular powders, agglomerates or granulates. Such compositions may be practically anhydrous, but they may also contain water of crystallization or water of hydration. The agents according to the invention, however, may also be used as pastes, dispersions or solutions. They then contain smaller or larger amounts of liquid solvents, as for example, water or organic water-soluble solvents, in which the remaining constituents are partly or completely dissolved. For specific cleansing purposes, for example, solutions may be used which contain up to 1% by weight, preferably up to 4% by weight of the solid composition. The solutions, dispersions or pastes may also be substantially more concentrated, so that the amount of the solvent constitutes up to 30% by weight, preferably up to 50% by weight, of the composition. Hydrotropic substances may also be incorporated in the solutions, dispersions or pastes.

A composition of the agent according to the invention which is suitable for many purposes can be taken from the following recipe, based on the water- and/or solvent-free preparations:

5 to 30%, preferably 8 to 20%, by weight of a surface-active component (a),
2 to 6%, preferably 3 to 5%, by weight of a soap component (b),
15 to 93%, preferably 20 to 50%, by weight of a complex-forming salt component (c),
0 to 50%, preferably 5 to 40%, by weight of other components from the group of dirt carriers, optical brightener, bleaching components, alkaline- or neutral-reacting non-complex-forming salts, textile softeners, antimicrobial agents, enzymes, dyestuffs and perfumes.

Preferably in any composition of the invention components (a), (b) and (c) are present in a weight ratio of 2 to 10:1:7 to 35, particularly 2½ to 8½:1:7½ to 25.

The other further components of the compositions according to the invention, arranged according to the class of substance, are further described below.

A composition according to the invention preferably suitable as a boiling washing agent may contain 5 to 40%, preferably 7 to 35%, by weight of a bleaching component consisting of a compound yielding $H_2O_2$ in water, a stabilizer and possibly an activator. Of the compounds which yield $H_2O_2$ in water, sodium perborate tetrahydrate ($NaBO_2.H_2O_2.3H_2O$) and the monohydrate ($NaBO_2.H_2O_2$) have special practical importance. However, other borates yielding $H_2O_2$ are also useful, for example, perborax $Na_2B_4O_7.4H_2O_2$. These compounds may be partly or completely replaced by other active oxygen carriers, especially by peroxyhydrates, such as peroxycarbonates ($Na_2CO_3.1.5H_2O_2$), peroxypyrophosphates, citrateperhydrates, urea-$H_2O_2$ or melamine-$H_2O_2$ compounds as well as by peracid salts yielding $H_2O_2$ as, for example, Caro's acid salt ($KHSO_5$), perbenzoates or perphthalates.

It is advisable to incorporate water-soluble and/or water-insoluble stabilizers for the peroxy compounds in amounts from 0.25 to 10% by weight. Suitable water-insoluble stabilizers, which constitute, for example, 1 to 8%, preferably 2 to 7%, of the weight of the total preparation, are magnesium silicates of the composition $MgO:SiO_2 = 4:1$ to 1:4, preferably 2:1 to 1:2 and especially 1:1. Other alkaline earth metal, cadmium or tin silicates of corresponding composition are useful in their place, and water-containing oxides of tin are also suitable. Water-soluble stabilizers, which may be present together with the water-insoluble stabilizers, are the above-mentioned organic complex-forming substances from the group of aminopolycarboxylic acids, phosphonic acids and polyhydroxycarboxylic acids, the amount of which may constitue 0.25 to 5%, preferably 0.5 to 2.5%, by weight of the total preparation.

Activators for percompounds, if used, are primarily the N-acyl and O-acyl compounds where the acyl has from 1 to 8 carbon atoms and the carbonic and pyrocarbonic acid esters whose activation value for percompounds (titer) is at least 3, preferably at least 4.5. Preferably 0.05 mols to 2 mols of activator are employed per gram-atom of active oxygen from the percompound.

The optical brighteners which can be utilized in the compositions are mostly, if not exclusively, derivatives of aminostilbenesulfonic acid, or of diaminostilbenedisulfonic acid, of diarylpyrazolines, of carbostyril, of 1,2-di-(2-benzoxazolyl)-ethylene or 1,2-di-(2-benzimidazolyl)-ethylene, of benzoxazolyl-thiophene and of the coumarins.

Examples of brighteners from the class of the diaminostilbene acid derivatives are compounds, according to formula I:

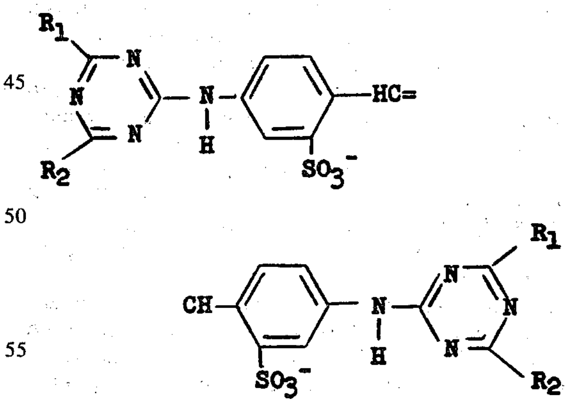

I

In the formula, $R_1$ and $R_2$ represent alkoxy, amino, or residues of aliphatic, aromatic or heterocyclic, primary or secondary amines as well as residues of aminosulfonic acids, where the aliphatic residues present in the above groups contain preferably 1 to 4 and particularly 2 to 4 carbon atoms, while the heterocyclic ring systems are mostly 5 to 6 membered rings. As aromatic amines the residues of the aniline, of the anthranilic acid or the anilinesulfonic acid are preferred. Brighteners, derived from the diaminostilbenedisulfonic acid, are mostly used as cotton brighteners. The following products, derived from formula I, are commercially available, where $R_1$ represents the residue $—NHC_6H_5$ and $R_2$ may represent the following residues: $—NH_2$, $—NHCH_3$, $—NHCH_2CH_2OH$, $—NHCH_2CH_2OCH_3$, $—NHCH_2CH_2CH_2OCH_3$, $—N(CH_3)CH_2CH_2OH$, $—N(CH_2CH_2OH)_2$, morpholino-, $—NHC_6H_5$, $—NHC_6H_4SO_3H$, $—OCH_3$. Some of these brighteners are, in regard to their fiber affinity, regarded as transitional types to the polyamide brighteners, such as the brightener with $R_2 = —NHC_6H_5$. The compound 4,4'-bis-(4-phenyl-1,2,3-tiiazole-2-yl)-2,2'-stilbenedisulfonic acid belongs also to the cotton brighteners of the diaminostilbenedisulfonic acid type.

Diarylpyrazolines of formulae II and III belong to the polyamide brighteners.

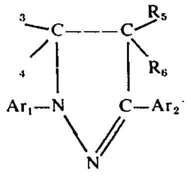

II

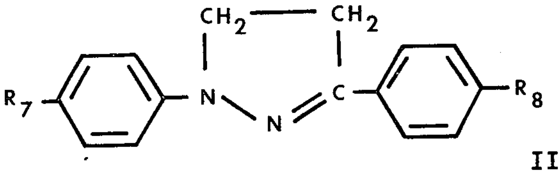

III

In formula II, $R_3$ and $R_5$ represent hydrogen, alkyl, and aryl, optionally substituted by carboxyl, carbonamide or carboxylic acid ester groups, $R_4$ and $R_6$ represent hydrogen or lower alkyl, $Ar_1$ and $Ar_2$ represent aryl radicals, such as phenyl, diphenyl or naphthyl, which may carry further substituents, such as hydroxy, alkoxy, hydroxyalkyl, amino, alkylamino, acylamino, carboxyl, carboxylic acid esters, sulfonic acid, sulfonamide and sulfone groups or halogen atoms. Commercially available brighteners of this type are derived from the formula III, where the radical $R_7$ may represent the groups Cl, $—SO_2NH_2$, $—SO_2CH{=}CH_2$, and $—COOCH_2CH_2OCH_3$, while $R_8$ mostly represents a chlorine atom. Also the 9-cyano-anthracene belongs to the polyamide brighteners.

The polyamide brighteners further include aliphatically or aromatically substituted aminocoumarins, such as 4-methyl-7-dimethylamino-coumarin or 4-methyl-7-diethylamino-coumarin. Further usable as polyamide brighteners are the compounds 1-(2-benzimidazolyl)-2-(1-hydroxyethyl-2-benzimidazolyl)-ethylene and 1-ethyl-3-phenyl-7-diethylamino-carbostyril. Suitable as brighteners for polyester and polyamide fibers are the compounds 2,5-di-(2-benzoxazolyl)-thiophene, 2-(2-benzoxazolyl)-naphtho[2,3-b]-thiophene, and 1,2-di-(5-methyl-2-benzoxazolyl)-ethylene.

If the brighteners together with other ingredients of the invention products are present as aqueous solution or paste, and are to be transformed to solids by heat drying, it is recommended to incorporate organic sequestering agents in amounts of at least 0.1%, preferably 0.2 to 1%, by weight of the solid products in order to stabilize the brighteners.

Further, dirt carriers or soil suspension agents may be contained in the preparations according to the invention which hold the dirt, detached from the fibers, suspended in the bath and thus prevent greying. Water-soluble colloids of mostly organic nature are suitable for this purpose, as for example, the water-soluble salts of ethercarboxylic acids or ethersulfonic acids of starch or cellulose or salts of acid sulfuric acid esters of cellulose or starch.

The alkali metal bicarbonates, carbonates, borates, silicates and sulfates, for example, may be present as neutral or alkaline-reacting, non-complexing-forming builder salts. The alkali metal salts of organic, non-surface-active sulfonic acids, carboxylic acids and sulfocarboxylic acids containing 1 to 8 carbon atoms are also useful. These include, for example, water-soluble salts, particularly the alkali metal salts, of benzenesulfonic acid, toluenesulfonic acid or xylenesulfonic acid, of sulfoacetic acid, sulfobenzoic acid or of sulfodicarboxylic acid, as well as the salts of acetic acid, lactic acid, citric acid and tartaric acid.

The enzymes include the customarily employed amylases, lipases and proteases usually obtained from bacterial strains and fungi, such as *Bacillus subtilis* and *Streptomyces griseus*.

The textile softeners, if used, are the customary cationic compounds which are compatible with anionic washing compositions.

The antimicrobial agents are the customary compounds such as the halogenated phenolethers and thioethers, halogenated carbanilides and acylanilides and halogenated diphenylmethanes.

The constituents of the washing compositions according to the invention are usually selected so that the preparations have a neutral to distinctly alkaline reaction, so that the pH value of a 1% solution of the composition of the invention lies mostly in the range of from 7 to 12. Fine washing compositions usually have a neutral to weakly alkaline reaction (pH value 7 to 9.5), while prewashing and boiling washing compositions are made more strongly alkaline (pH value 9.5 to 12, preferably 10 to 11.5).

The pulverulent compositions according to the following formulations are of special practical importance for use in drum washing machines:

A. BOILING WASHING COMPOSITION 8 to 30% by weight of a surface-active combination of olefinsulfonate and/or α-sulfo-fatty acid ester salt and a non-ionic surface-active compound (component a), and a soap (component b);

30 to 80% by weight of builder salt compounds which consist essentially of a complex-forming salt (component c) and which include a fraction of 0.1 to 5% by weight of a substance forming a complex with heavy metals and a fraction of not more than 15% by weight of a sodium phosphate, based in each case on the total washing composition;

10 to 35% by weight of sodium perborate;

1 to 5% by weight of magnesium silicate;

1 to 40% by weight of other constituents.

B. PREWASHING COMPOSITION 7 to 20% by weight of a surface-active combination of olefinsulfonate and/or α-sulfo-fatty acid ester salt and possibly a non-ionic surface-active compound (component a), and a soap (component b);

10 to 65% by weight of builder substances, which consist essentially of a complex-forming salt (component c) and include a fraction of not more than 15% by weight of sodium tripolyphosphate, based on the total washing composition;

33 to 70% by weight of other constituents.

C. FINE AND COLORED WASHING COMPOSITION 10 to 36% by weight of a surface-active combination of olefinsulfonate and/or α-sulfo-fatty acid ester salt and possibly having a fraction of 1 to 10% by weight, based on the total washing composition, of an additional surface-active compound of the sulfate or sulfonate type (component a) and a soap (component b);

20 to 60% by weight of builder substances, which consist essentially of a complex-forming salt (component c) and which include a fraction of not more than 15% by weight of sodium tripolyphosphate, based on the total washing composition;

30 to 70% by weight of other constituents.

The washing compositions A, B and C contain as other constituents at least one of the following components in the indicated amounts:

2 to 70% by weight of sodium sulfate,
1 to 20% by weight of sodium silicate and/or sodium carbonate,
0.2 to 3% by weight of a soil suspension agent,
0.2 to 3% by weight of enzymes,
2 to 8% by weight of a textile softener,
0.1 to 1% by weight of an optical brightener,
0.01 to 1% by weight of dyestuff and perfume,
0.2 to 2% by weight of an antimicrobial agent.

The following examples are illustrative of the invention without being deemed limitative in any manner.

EXAMPLES

The following examples describe washing compositions according to the invention with the above-defined components (a), (b) and (c). The salt-like constituents contained therein are present as the sodium salts, when it is not expressly stated otherwise. The preparations were prepared by admixture of the single constituents. The terms or abbreviations given in Tables I and II have the following meaning.

"Olefinsulfonate" is a sulfonate of the composition 40% by weight hydroxyalkanesulfonate, 50% by weight alkenesulfonate and 10% by weight alkanedisulfonate, obtained from a mixture of olefins having 15 to 18 carbon atoms by sulfonation with $SO_3$ and hydrolysis of the sulfonation product with alkali. The olefinsulfonate was prepared from two different types of olefinsulfonates based on a straight-chain terminal olefin or a straight-chain non-terminal olefin.

"Fs-estersulfonate" is a sulfonate obtained from the methyl ester of a hardened tallow fatty acid by sulfonation with $SO_3$.

"Soap A" or "Soap B" are soaps prepared from a fatty acid mixture containing 9% by weight of a fatty acid $C_{18}$, 14% by weight of a $C_{20}$ fatty acid, and 77% by weight of a $C_{22}$ fatty acid (iodine value 3) (Soap A); and 8% by weight of a $C_{16}$ fatty acid, 32% by weight of a $C_{18}$ fatty acid, 12% by weight of a $C_{20}$ fatty acid, and 48% by weight of a $C_{22}$ fatty acid (iodine value 4) (Soap B), respectively.

"PEM" is the sodium salt prepared from 1:1 copolymerizate of ethylene and maleic acid anhydride with a specific viscosity 0.29 (1% by weight dissolved in dimethyl formamide at room temperature).

"PPM" is the sodium salt prepared from a 1:1 copolymerizate of propylene and maleic acid anhydride with a specific viscosity 0.30 (1% by weight dissolved in dimethyl formamide at room temperature).

"ABS" is the salt of an alkylbenzenesulfonic acid with 10 to 15, substantially 11 to 13, carbon atoms in the alkyl chain, obtained by condensation of straight-chain olefins with benzene and sulfonation of the alkylbenzene thus formed.

"Alkanesulfonate " is a sulfonate obtained from paraffins having 12 to 16 carbon atoms by way of sulfoxidation.

"KA-sulfate" and "TA-sulfate" are the salts of sulfated, substantially saturated fatty alcohols obtained by reduction of coconut fatty acid and tallow fatty acid respectively.

"KA-EO-sulfate" and "TA-EO-sulfate" are the sulfated products of addition of 2 mols of ethylene oxide to 1 mol of coconut fatty alcohol and 3 mols of ethylene oxide to 1 mol of tallow fatty alcohol respectively.

"OA + 10 EO" and "TA + 14 EO" are the products of addition of ethylene oxide (EO) to technical oleyl alcohol (OA), and tallow alcohol (TA), respectively.

"Perborate" is a product containing about 10% of active oxygen of the approximate composition $NaBO_2.H_2O_2.3H_2O$.

"NTA", "EDTA" and "HEDP" are the salts of nitrilotriacetic acid, ethylenediaminetetraacetic acid and hydroxyethanediphosphonic acid, respectively.

"CMC" is the salt of carboxymethylcellulose.

"Stilbene brightener" is a compound of Formula I on page 12, in which $R_1$ represents an anilino residue and $R_2$ represents a morpholino residue.

"Pyrazoline brightener" is a compound of Formula III on page 13, in which $R_7$ represents a sulfamoyl residue and $R_8$ represents chlorine.

In all the examples the amounts given relate to the pure substances. These substances may contain accompanying substances, depending on the preparation as, for example, water, sodium sulfate, sodium chloride, sodium carbonate, etc. Since such accompanying substances do not in any way impair the activity of the individual substances, they are not mentioned in the formulations. The expression "residue", therefore, stands essentially for water and the above-mentioned salts as well as for dyestuffs and perfumes.

EXAMPLES 1 TO 5

In the determination of the foaming behaviour, washing compositions according to the invention of the following composition were used:

7.5% by weight Fs-estersulfonate or olefinsulfonate, part of which may be replaced by ABS,
3.2% by weight of Soap A,
40.0% by weight of complex-forming salts PEM or PPM,
24.0% by weight of perborate,
2.5% by weight of OA + 10 EO (iodine value 50),
3.5% by weight of $Na_2O.3.3\ SiO_2$,
1.2% by weight of CMC,
Remainder sodium sulfate and water.

The foaming behavior was tested under conditions approximately to practice in a commercial fully-automatic washing machine with a horizontally positioned drum, as a function of the temperature of the alkaline bath. The machine was fitted with a round sight glass, through which the level of the foam could be observed. The following values were given for the estimation of the height of foam:

| Value | Maximum Height of the Foam Level |
|---|---|
| 0 | No foam |
| 1 | 1/4 of the sight glass |
| 2 | 1/2 of the sight glass |
| 3 | 3/4 of the sight glass |
| 4 | 4/4 of the sight glass |
| 5 | Foam visible in the filing pipe |
| 6 | Foaming over |

The washing machine was charged with 3.5 kg of clean laundry. The concentration of washing composition was 7.5 gm/liter. The weight ratio of textiles to washing liquor was 1:5. The washing water had a hardness of 3° (30ppm CaO).

The washing compositions of Examples 1 to 5 were tested at temperatures between 30° and 98°C. For comparison a preparation was tested which contained 7.5% by weight of olefinsulfonate, 3.2% of Soap A, and 40% by weight of sodium tripolyphosphate as complex-forming substance. The results are given in the following Table I.

TABLE I

| Exam. | Specific Components | Foam Values At 30°C | 50°C | 70°C | 90°C | 98°C |
|---|---|---|---|---|---|---|
| 1 | Fs-estersulfonate, PEM | 3 | 4 | 2.5 | 1 | 1 |
| 2 | Olefinsulfonate, PEM | 3 | 4.5 | 2 | 1 | 1 |
| 3 | Fs-estersulfonate, PPM | 4.5 | 3.5 | 0.5 | 0 | 3 |
| 4 | Olefinsulfonate, PPM | 3.5 | 4 | 2.5 | 4 | 4 |
| 5 | Fs-estersulfonate and ABS 1:0.5, PEM | 3.5 | 3.5 | 0.5 | 2 | 4 |
| | Comparison: | | | | | |

TABLE I-continued

| Exam. | Specific Components | Foam Values At 30°C | 50°C | 70°C | 90°C | 98°C |
|---|---|---|---|---|---|---|
| | Olefinsulfonate, sodium tripoly-phosphate | 3 | 4.5 | 5 | 5 | 6 |

From the values in Table I the foam regulation with the preparations according to the invention becomes clear. While in the lower range of temperature the desired height of foam is produced which also allows the tested washing composition to be used for fine washing, especially for washing woolen textiles, the development of foam in the upper boiling washing range was inhibited, in some cases strongly, so that no foaming over was observed even at the boiling washing temperatures. On the other hand, the washing composition used for comparison foamed over in the boiling washing range, owing to which a loss of bath liquid of 0.4 to 0.6 liters occurred.

EXAMPLES 6 TO 11

The examples in the following Table II represent further forms of the invention. Of these, Examples 6 and 7 are are preferably utilizable as full washing agents. Examples 8 and 9 are utilizable as prewashing agents and Examples 10 and 11 are utilizable as fine and colored washing agents.

TABLE II

| Constituent | % Wt. of Constituent in the Composition According to Example 6 | 7 | 8 | 9 | 10 | 11 |
|---|---|---|---|---|---|---|
| Fs-estersulfonate | 5.0 | — | — | 3.0 | 8.0 | 6.0 |
| Olefinsulfonate | 2.0 | 6.0 | 6.0 | 2.0 | 10.0 | — |
| ABS | 2.0 | — | — | — | 3.0 | 2.0 |
| Alkanesulfonate | — | 1.5 | — | — | — | — |
| Toluenesulfonate | — | — | — | — | 2.0 | — |
| KA-sulfate | — | — | — | — | 2.0 | — |
| TA-sulfate | — | — | — | 1.0 | — | — |
| KA-EO-sulfate | — | — | — | — | — | 1.5 |
| TA-EO-sulfate | — | — | — | — | 2.0 | — |
| OA + 10 EO | 2.0 | — | 2.0 | — | — | — |
| TA + 14 EO | — | 2.0 | — | 2.0 | — | — |
| Soap A | 3.5 | 3.5 | — | — | — | 3.5 |
| Soap B | — | — | 2.0 | 2.0 | 3.0 | — |
| PEM | 30.0 | — | 50.0 | — | 20.0 | 40.0 |
| PPM | — | 40.0 | — | 45.0 | — | — |
| Sodium tripoly-phosphate | 10.0 | — | — | — | — | — |
| NTA | — | 0.7 | — | — | — | — |
| EDTA | 0.5 | — | — | — | — | — |
| HEDP | — | 0.3 | — | — | — | — |
| Perborate | 26.0 | 26.0 | — | — | — | — |
| Magnesium silicate | 1.5 | 2.0 | — | — | — | — |
| Sodium carbonate | — | — | — | 5.0 | — | — |
| $Na_2O$. 3.3 $SiO_2$ | 3.5 | 3.5 | 3.0 | 3.2 | — | 3.5 |
| CMC | 1.5 | 1.5 | 1.0 | 1.0 | — | — |
| Stilbene brightener | 0.3 | 0.3 | 0.2 | 0.2 | — | 1.5 |
| Pyrazoline brightener | — | — | — | 0.01 | — | 0.01 |
| Remainder | | | | | | |

The preceding specific embodiments are illustrative of the practice of the invention. It is to be understood, however, that other expedients known to those skilled in the art or disclosed herein may be employed without departing from the spirit of the invention or the scope of the appended claims.

We claim:

1. A foam-regulated washing composition consisting essentially of a. a surface-active component consisting of from 50 to 100% by weight of said component of an anionic surface-active compound selected from the group consisting of olefin-sulfonates having from 8 to 18 carbon atoms and α-sulfo-fatty acid ester salts having from 10 to 20 carbon atoms in the fatty acid moiety esterified with an alcohol selected from the group consisting of alkanols having from 1 to 4 carbon atoms, alkanediols having from 2 to 4 carbon atoms and alkanetriols having from 3 to 4 carbon atoms, and from 0 to 50% by weight of said component of a surface-active compound having good biodegradability and low toxicity selected from the group consisting of anionic surface-active compounds of the sulfonate and sulfate type other than said olefinsulfonates and α-sulfo-fatty acid ester salts, and non-ionic surface-active compounds, b. soaps of essentially saturated fatty acids having an iodine value of less than 5 and at least 50% of which have from 20 to 24 carbon atoms, c. a complexing builder salt component consisting of from 75 to 100% by weight of said component of a high molecular-weight polyalkylene-polycarboxylic acid copolymer of a lower alkene having from 2 to 4 carbon atoms with maleic acid, in substantially an equimolar ratio, and from 0 to 25% by weight of said component of complexing builder salts having phosphorus or nitrogen atoms, said components (a), (b), and (c) being present in a weight ratio of 2 to 10:1:7 to 35.

2. The foam-regulated washing composition of claim 1 wherein components (a), (b) and (c) are present in a weight ratio of 2½ to 8½:1:7½ to 25.

3. The foam-regulated washing composition of claim 1 wherein said high-molecular-weight polyalkylene-polycarboxylic copolymer is a water-soluble salt of a 1:1 copolymer of ethylene and maleic acid anhydride.

4. The foam-regulated washing composition of claim 1 wherein said high-molecular-weight polyalkylene-polycarboxylic copolymer is a water-soluble salt of a 1:1 copolymer of propylene and maleic acid anhydride.

5. A foam-regulated washing agent consisting of the foam-regulated washing composition of claim 1 wherein the various ingredients have the following composition based on a water-free and solvent-free basis:

5 to 30% by weight of component (a),
2 to 6% by weight of component (b), and
15 to 93% by weight of component (c) and containing at least one of the following ingredients in the amounts specified:
from 5 to 40% by weight of a bleaching component yielding $H_2O_2$ in water,
from 0.2 to 3% by weight of soil suspension agents,
from 0.1 to 1% by weight of optical brighteners,
from 2 to 8% by weight of textile softeners,
from 0.2 to 2% by weight of antimicrobial agents,
from 0.2 to 3% by weight of enzymes, and
from 0.01 to 1% by weight of dyestuffs and perfumes.

* * * * *